United States Patent
Kabierschke et al.

[11] Patent Number: 5,944,053
[45] Date of Patent: Aug. 31, 1999

[54] SOLENOID VALVE FOR HEATING SYSTEMS

[75] Inventors: Detlef Rainer Kabierschke, Bergisch Gladbach; Joergen Marx, Cologne; Thomas Nienhaus, Kvln, all of Germany

[73] Assignee: Ford Global Technologies, Inc., Dearborn, Mich.

[21] Appl. No.: 09/030,558

[22] Filed: Feb. 25, 1998

[30] Foreign Application Priority Data

Feb. 26, 1997 [DE] Germany ............................. 19707666

[51] Int. Cl.$^6$ .................................................. F16K 11/048
[52] U.S. Cl. ................................ 137/625.29; 137/625.5; 251/48; 251/64
[58] Field of Search .......................... 137/625.29, 625.5; 251/48, 64

[56] References Cited

U.S. PATENT DOCUMENTS 5,564,458  10/1996  Roth et al. .................. 137/625.29 X

FOREIGN PATENT DOCUMENTS 60-1486   1/1985  Japan ................................ 251/64

Primary Examiner—Gerald A. Michalsky
Attorney, Agent, or Firm—Raymond L. Coppiellie

[57] ABSTRACT

A solenoid valve for use in heating systems in motor vehicles is disclosed. The solenoid valve includes a housing having a core which is axially movable in the housing and is connected by a shaft to a valve member. The valve member includes two valve heads, spaced apart from one another, one of which contacts an abutment region formed in a base plate of the solenoid housing. The abutment region provides damping to reduce solenoid noise.

4 Claims, 3 Drawing Sheets

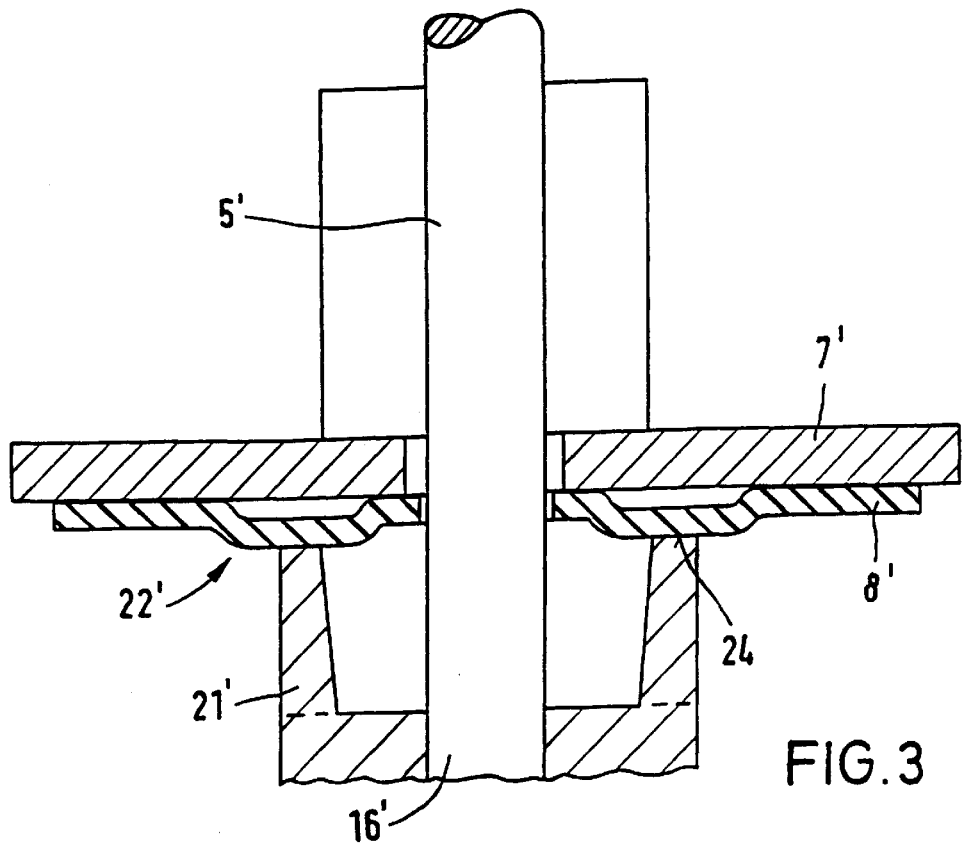
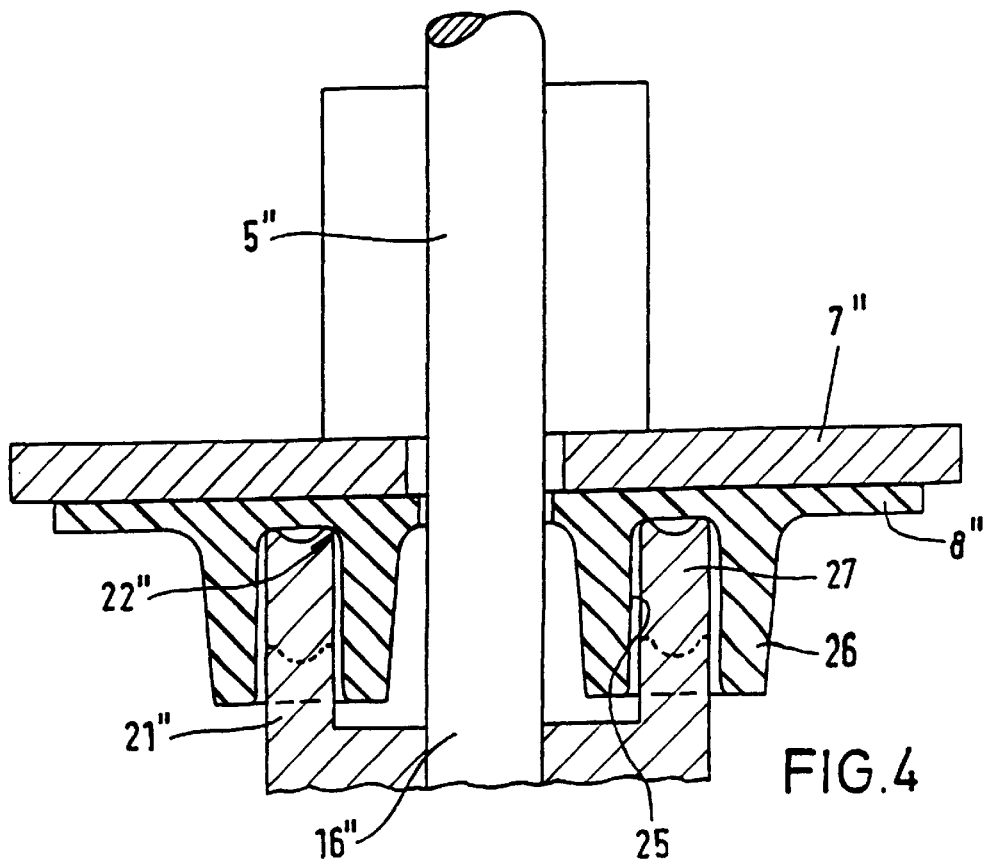

SOLENOID VALVE FOR HEATING SYSTEMS

BACKGROUND OF THE INVENTION

1. Field of the Invention

The present invention relates to a solenoid valve, particularly for heating systems of motor vehicles.

2. Disclosure Information

German Offenlegungsschrift 42 26 521 discloses a solenoid valve used for heating systems in motor vehicles. The solenoid valve includes a core, axially movable in a solenoid, which actuates, via a shaft, a valve member having two valve heads spaced apart from one another, one of which controls a forward flow and the other a return flow. When one valve head in the closed position is seated on a first valve seat, the other valve head has its supporting end up against an abutment region of a base plate having an elastic facing.

Such solenoid valves for heating systems in motor vehicles are controlled in clocked mode, that is to say, the amount of liquid flowing through the valve depends on the pulse width of the control unit of the solenoid valve. Thus the supporting end provided on one valve head strikes at regular, shorter or longer intervals against the base plate having the elastic facing. And it has been found that depending on the position where the solenoid valve is fitted, this impact causes noise which can be perceived by the occupants of the vehicle as annoying.

German Offenlegungsschrift 41 10 254 discloses a solenoid valve for hydraulic circuits in motor vehicles in which such an impact noise can be avoided by electronic control of the solenoid. This known solenoid valve thus requires a more technically complex and expensive control unit.

The object of the invention is to provide an improved solenoid valve, particularly for heating systems in motor vehicles, in which the impact noises are damped by simple mechanical means to such an extent the they are no longer perceived to be annoying.

SUMMARY OF THE INVENTION

To this end, the present invention provided a solenoid valve, particularly for heating systems in motor vehicles, having a housing with a base plate having an elastic facing on one side thereof. The solenoid valve includes a core which is axially movable in the housing and is connected by a shaft to a valve member. The valve member carries two valve heads spaced apart from one another which co-operate with corresponding valve seats in a pipe connection housing of the heating system. One of the valve heads in the closed position is controllably seated on the first valve seat under the control of the solenoid, and in the open position, brought about by a spring, has its supporting end up against an abutment region on the base plate with the elastic facing. The abutment region on the base plate for the supporting end of the valve head is provided with one or more recesses which provide improved damping.

Providing one or more recesses in the abutment region for the supporting end of one of the valve heads results first in improving the springing effect of the elastic facing that is present. Secondly, as a result of liquid entering the recesses and being forced out on impact, provides damping so that the impact noises are no longer perceived as annoying.

These recesses can be formed directly by depressions in the base plate in the abutment region and immediately below the elastic facing. Alternatively, these recesses can be in the form of correspondingly shaped raised bulges in the elastic facing while the base plate remains flat. Another possibility is for the recesses to be in the form of depressions or pockets formed on the elastic facing which co-operate with the supporting feet of the valve head.

BRIEF DESCRIPTION OF THE DRAWINGS

The invention will now be described in more detail, by way of example, with reference to embodiments illustrated in the drawings, in which:

FIG. 3 shows a further embodiment of the details in the region of the base plate; and FIG. 4 shows yet another possible embodiment of the details in the region of the base plate.

DETAILED DESCRIPTION OF PREFERRED EMBODIMENTS

Figure 1:
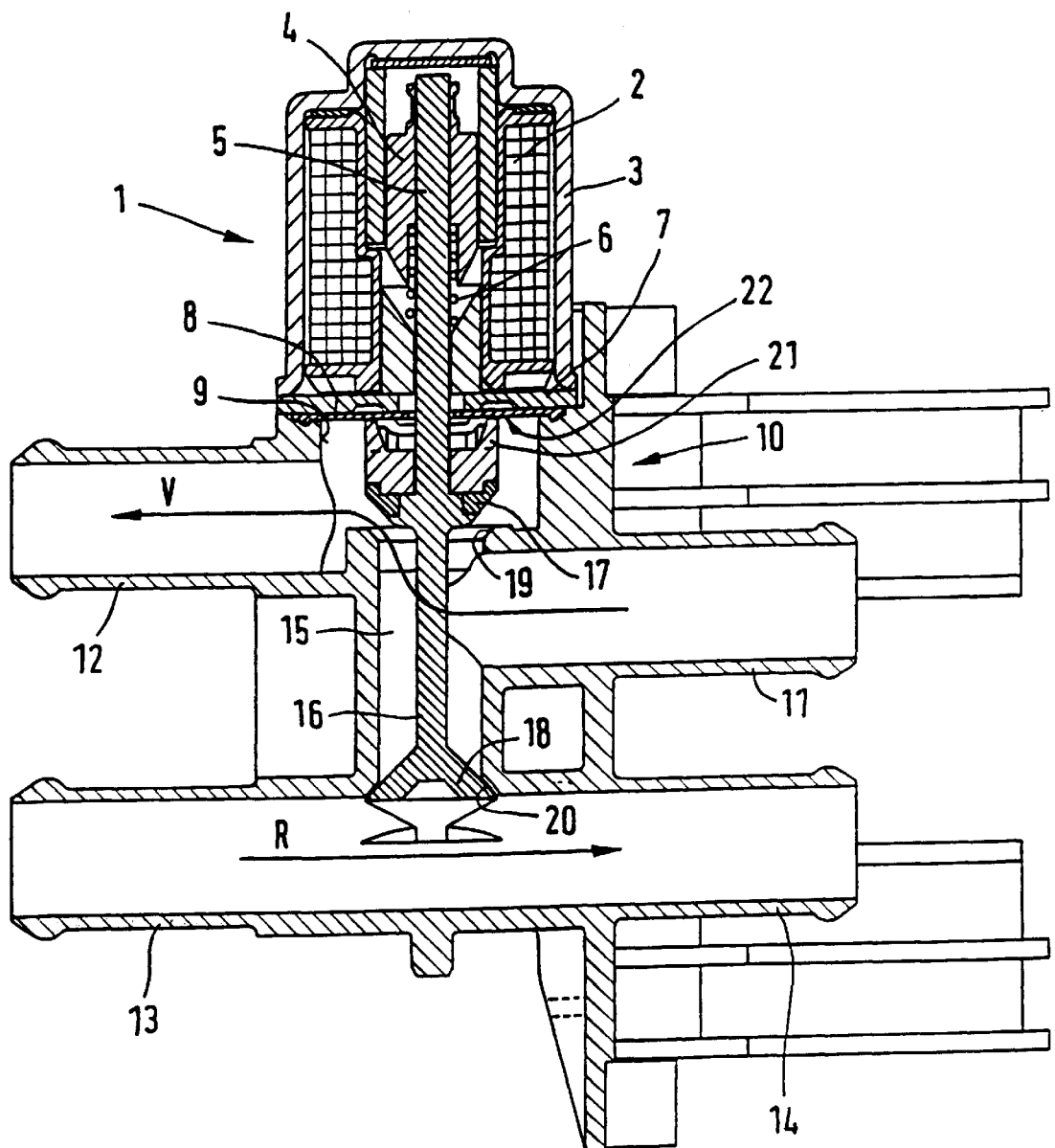
FIG. 1 shows a vertical, cross-section through a solenoid valve in accordance with the invention.

FIG. 1 shows a solenoid valve 1 such as can be used to control heating systems in motor vehicles. The solenoid valve 1 consists essentially of a solenoid 2 which is located in a solenoid housing 3 and receives concentrically in its interior a core 4 with a shaft 5 which is urged in the opening direction by a spring 6. The solenoid housing 3 is closed off by a base plate 7 which is provided with an elastic facing 8 with which it is seated and mounted, sealed to the outside, on a fitting opening 9 of a pipe connection housing 10 of a heating system.

The pipe connection housing 10 comprises outflow connections 11 and 12 and return flow connections 13 and 14 for the heating medium. Extending between the outflow and the return there is a connecting passage 15 in which a valve member 16 is fitted which is, e.g., formed in one piece with the shaft 5 of the core 4 of the solenoid valve 1.

The valve member 16 is provided with two valve heads 17 and 18, spaced apart from one another, which can co-operate with corresponding valve seats 19 and 20 in the pipe connection housing 10. A supporting end 21 is formed on one valve head 17 which, when no current is flowing through the solenoid valve 1 and the valve head 17 is held in the open position by the spring 6, comes up against an abutment region 22. Despite the elastic facing 8, this produces impact noises which are perceived by occupants of the motor vehicle as annoying. This is particularly the case if, for control of the heating system of the vehicle, the solenoid valve is located in the dashboard region relatively close to the occupants of the vehicle.

Figure 2:
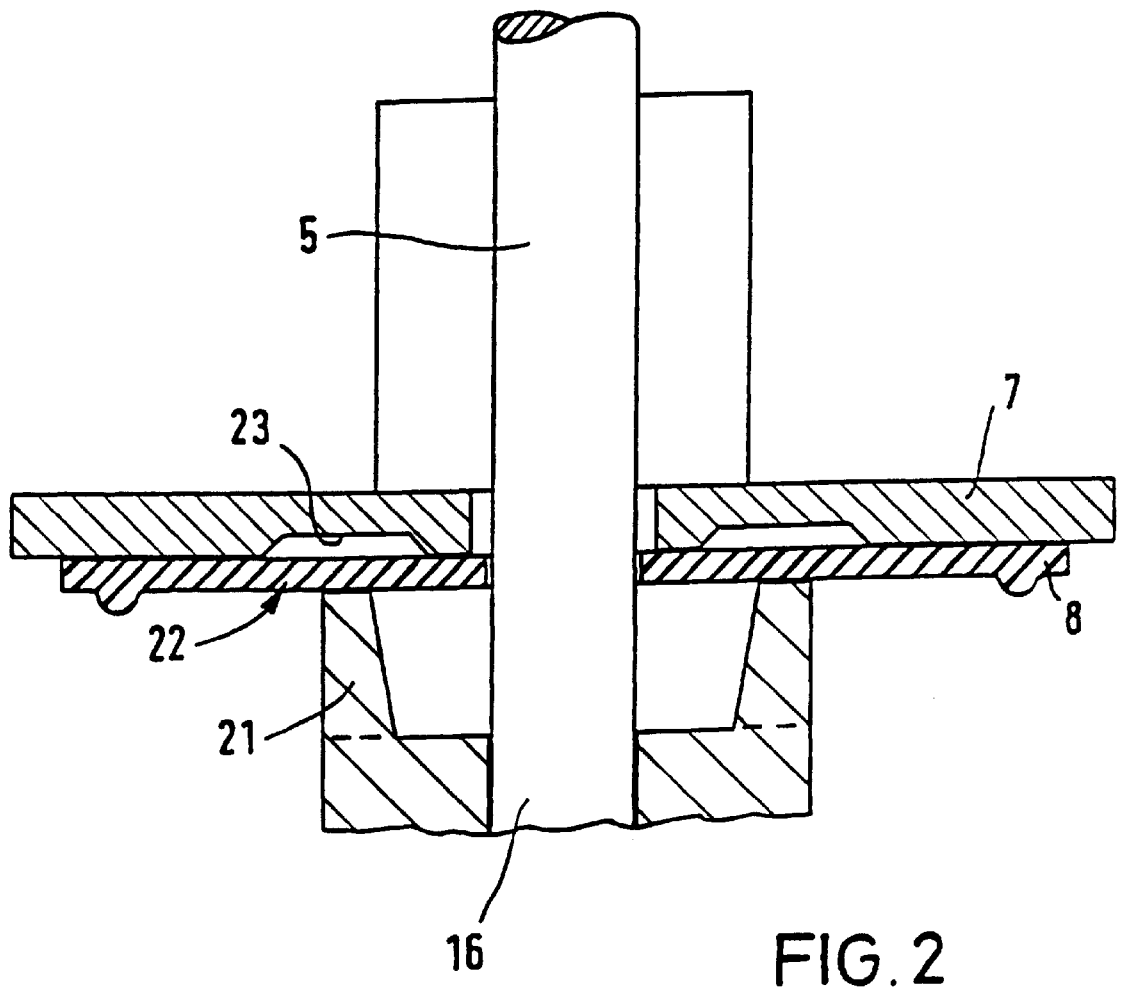
FIG. 2 shows on a larger scale details in the region of the base plate in FIG. 1.

According to the invention, as can be seen from the larger-scale illustration in FIG. 2, an annular recess 23 is provided in the base plate 7 in the abutment region 22 of the supporting end 21 of the valve head 17 immediately underneath the elastic facing 8. In the abutment region 22 of the supporting end 21 the elastic facing 8 thus forms a kind of annular membrane which damps the impact noises substantially better than if the elastic facing 8 were to be in direct contact with the flat base plate 7. In a particularly favourable manner, liquid collects in the recess 23 underneath the elastic facing 8 and is forced out by the impact of the supporting end 21, thus providing additional hydraulic damping.

An alternative form of the abutment region can be seen in FIG. 3, in which the same reference numerals are used to denote substantially similar parts, but are distinguished by an apostrophe. In this embodiment the base plate 7' is left flat and the elastic facing 8' of the valve member 16' is provided in the abutment region 22' for the supporting end 21' of the valve member 16' with a raised annular bulge 24 which likewise serves to provide a softer, annular, membrane like springing and damping means.

Yet another embodiment can be seen in FIG. 4, in which similar parts are again given the same reference numerals but with a double apostrophe. Here the base plate 7" remains flat and the elastic facing 8" is provided with depressions or pockets 25 and 26. The supporting end 21" of the valve member 16" is formed with feet 27 which enter the depressions and pockets 25 and 26, where they contribute to improved springing and damping of the supporting end 21" by forcing out liquid.

By forming the striking region of the supporting end of the valve member in accordance with the invention, the impact noise of the supporting end of the valve member can be reduced without the use of electronic control measures to such an extent that it can no longer be perceived as annoying by the occupants of the vehicle.

Various alterations and permutations of the present invention will occur to those skilled in the art. It is the following claims, including all equivalents, which define the scope of the present invention.

What is claimed is:

1. A solenoid valve for use in a heating system of a motor vehicle, the heating system having a pipe connection housing, comprising:

a solenoid housing including a base plate having an elastic facing disposed on one side thereof, said base plate including an abutment region disposed between said plate and said elastic facing;

a core axially movable in said housing and connected by a shaft to a valve member, said valve member having two valve heads spaced apart from one another, each valve head including a supporting member disposed at an end thereof and each co-operating with a corresponding valve seat in said pipe connection housing, and wherein each of said valve heads is adapted to be positionable in an open or closed position by said solenoid such that when one of said valve heads is in an open position, its supporting end contacts said elastic facing against said base plate and forces said elastic facing into said abutment region to provide improved springing.

2. A solenoid valve as claimed in claim 1, wherein said abutment region comprises an annular depression in said base plate adjacent said elastic facing.

3. A solenoid valve for use in a heating system of a motor vehicle, the heating system having a pipe connection housing, comprising:

a solenoid housing including a base plate having an elastic facing disposed on one side thereof, said base plate including an annular groove formed in said base plate and disposed between said plate and said elastic facing;

a core axially movable in said housing and connected by a shaft to a valve member; said valve member having two valve heads spaced apart from one another, each valve head including a supporting member disposed at an end thereof and each co-operating with a corresponding valve seat in said pipe connection housing, and wherein each of said valve heads is adapted to be positionable in an open or closed position by said solenoid such that when one of said valve heads is in an open position, its supporting end contacts said elastic facing against said base plate and forces said elastic facing into said annular groove to provide improved springing.

4. A solenoid valve as claimed in claim 3, wherein said annular groove is configured to receive fluid therein such that said fluid is expelled upon contact of said supporting end against said elastic facing.

* * * * *